United States Patent [19]
Jacobson et al.

[11] Patent Number: 4,506,557
[45] Date of Patent: Mar. 26, 1985

[54] LOAD CELL APPARATUS

[75] Inventors: Walter E. Jacobson, Meriden; Anthony H. Cibelli, Yalesville, both of Conn.

[73] Assignee: Revere Corporation of America, Wallingford, Conn.

[21] Appl. No.: 478,235

[22] Filed: Mar. 24, 1983

[51] Int. Cl.³ .............................................. G01L 1/22
[52] U.S. Cl. ................................................. 73/862.65
[58] Field of Search ..................... 73/862.65, 720, 726; 338/5; 177/211, 229

[56] References Cited

U.S. PATENT DOCUMENTS

| | | |
|---|---|---|
| 2,859,613 | 11/1958 | Green . |
| 3,180,139 | 4/1965 | Soderholm . |
| 3,341,796 | 9/1967 | Eisele . |
| 4,128,001 | 12/1978 | Marks ................................. 73/1 B |
| 4,185,496 | 1/1980 | Tisone et al. ..................... 73/775 X |
| 4,331,035 | 5/1982 | Eisele et al. ................. 73/862.67 X |
| 4,424,717 | 1/1984 | White .............................. 73/862.65 |

FOREIGN PATENT DOCUMENTS 2313953  9/1973  Fed. Rep. of Germany .......... 338/5

OTHER PUBLICATIONS

*EPSILONICS*, vol. 2, Issue 2, Jul. 1982, pp. 6–8.

Primary Examiner—Charles A. Ruehl

[57] ABSTRACT

A strain responsive device is a folded cantilever beam having an intermediate portion with a part-cylindrical surface on its under side. The reversely folded end of the beam extends under the part-cylindrical surface. The load is applied to the folded end in alignment with the center of the part-cylindrical surface. Strain gage elements are placed on a flat surface of the beam opposite the part-cylindrical surface. These elements are symmetrically arranged so that their centers are aligned with the centers of the two halves of the part-cylindrical surface. The beam has a substantially constant strain over the length thereof where the strain gage elements are attached, within any selected margin for error. The strain is thus evenly distributed over the length of the strain gage elements.

1 Claim, 5 Drawing Figures

LOAD CELL APPARATUS

PRIOR ART

The U.S. Pat. No. 2,859,613, to Green, shows a force measuring device formed as a double cantilever beam, supported at only one end. The beam of Green may be termed a folded cantilever beam since an extension from the free end of the beam extends or is "folded" back toward the supported end, and the force to be measured is applied to the end of the extension. The beam carries strain gage elements 13 and 14, which are located near the supported end of the beam.

Soderholm, U.S. Pat. No. 3,180,139 shows a double cantilever beam force transducer having a central cylindrical aperture which separates the upper and lower portions of the beam. Strain gage elements are placed on the outer flat surfaces of the beam and in some modifications are also placed on the inner curved surfaces. FIG. 4 of Soderholm shows the variation in strain from one end to the other of the beam structures shown. That variation is sharply peaked on either side of the midpoint of the beam, which is not strained.

Eisele, U.S. Pat. No. 3,341,796 shows a single folded cantilever beam with the more highly stressed parts of the beam wedge-shaped. He alternatively suggests making the upper or lower edges of the beam paraboloid in contour. His object is to provide uniform stress levels throughout the regions of the beam on which the strain gages are located.

BRIEF SUMMARY OF THE INVENTION

The present invention is a load cell formed as a folded cantilever beam. The preferred embodiment has a flat upper surface and a part-cylindrical lower surface. The part-cylindrical lower surface is made long as compared to the strain gage elements, which are placed so that the variation in stress along the length of each gage element is minimized. The ideal condition is to have the variation in stress constant, as in the structures proposed in the Eisele patent cited above. The load cells constructed in accordance with the present invention do not meet that ideal condition, but the applicants' beam structure with flat and part-cylindrical contours is considerably easier to manufacture, than the beams with paraboloid or wedge-shaped contours proposed by Eisele. The difference between the performance of the load cells of the present invention and the performance of a constant stress load cell may be made as small as desired, by proper design.

DRAWINGS

FIG. 1

Figure 1:
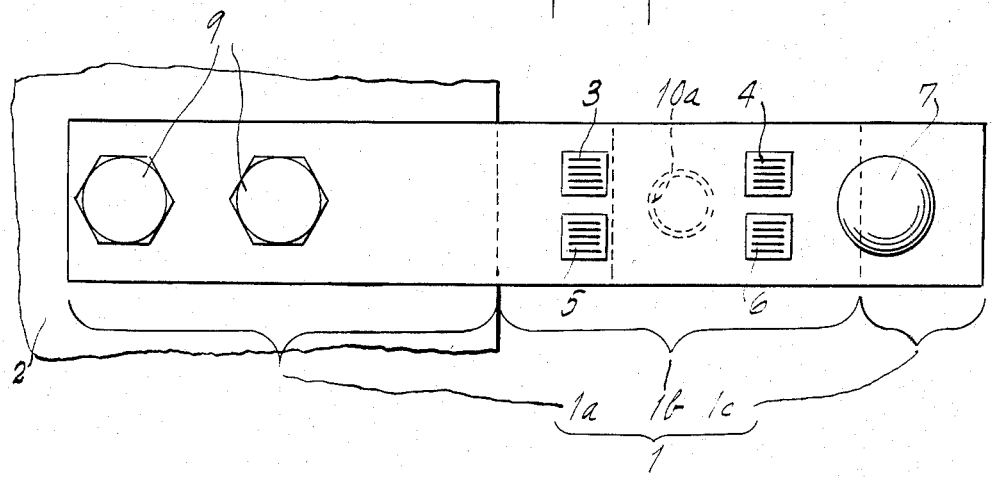
FIG. 1 is a plan view of a load cell embodying the invention.

There is shown in this figure an elongated cantilever beam 1 having an end portion 1a of constant rectangular cross-section, adapted to be mounted on a suitable support 2, e.g., by means of screws 9. The beam 1 has an arch-shaped portion 1b connecting the end portion 1a to an opposite end portion 1c. The end portion 1c has a constant cross-sectional area equal to that of portion 1a. The connecting portion 1b has a cross-sectional area which decreases gradually from the constant cross-section at 1a to a minimum at its center, identified by reference numeral 8, and then increases gradually to the same constant cross-sectional area at the end portion 1c. Four strain gage elements 3, 4, 5 and 6 are located adjacent the regions of maximum strain in the connecting portion 1b.

The end portion 1c is connected by a rivet 7 to a bar 10 which extends from the portion 1c under the portion 1b. At a point aligned with the center 8 of the portion 1b, the bar 10 is provided with a threaded aperture 10a for engaging a suitable load applying means.

Figure 2:
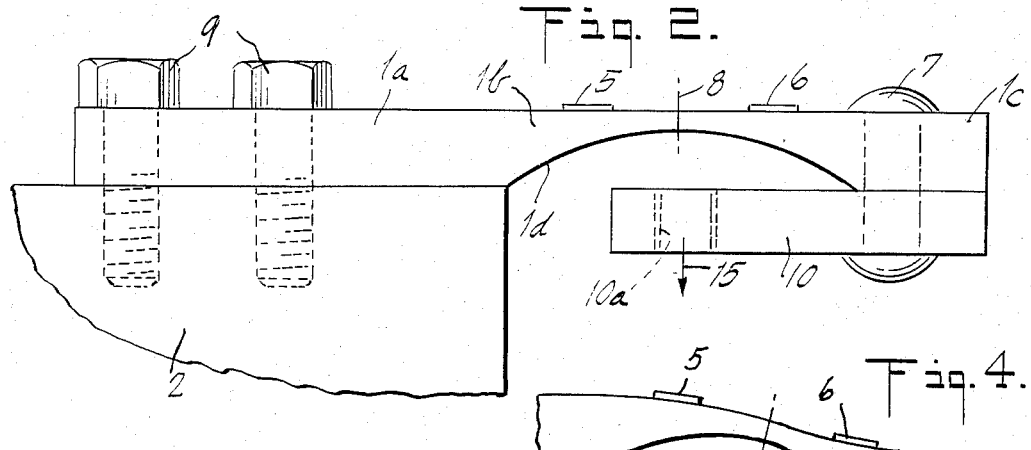
FIG. 2 is an elevational view of the load cell of FIG. 1.
Figure 3:
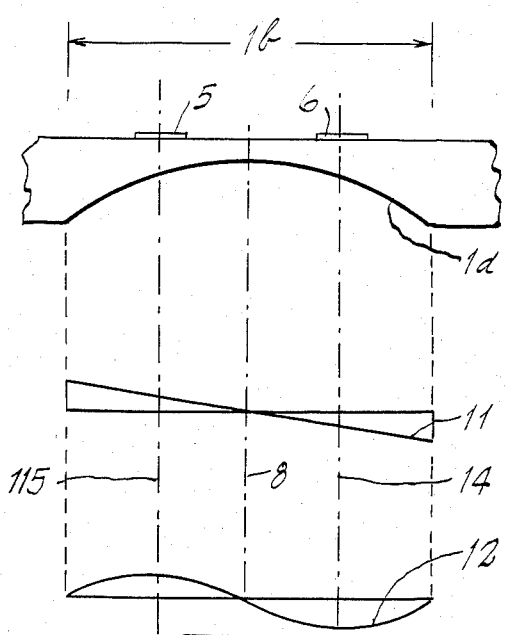
FIG. 3 is a graphical illustration showing the variation of moments and of strains through the arched section of the load cell of FIGS. 1 and 2.
Figure 5:
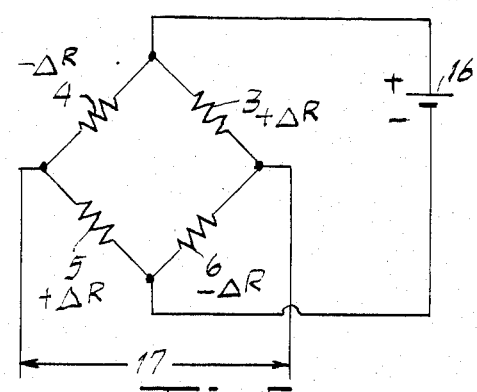
FIG. 5 is a wiring diagram showing the electrical connections of the strain gage elements.

The under surface of the portion 1b is formed as part of a cylinder, as shown at 1d in FIGS. 2 and 3. FIG. 3 includes a line 11 showing the variation in moment from one end of the portion 1b to the other. It may be seen that the moment has a negative value at the right-hand end of the portion 1b and an equal positive value at the left-hand end of that portion. At the center of the portion 1b, the moment is zero.

The curve 12 in FIG. 3 shows the variation of strain along the connecting portion 1b when the beam is loaded. It may be seen that the curve 12 includes a positively convex curve at the left-hand side of the center and a negatively convex curve at the right-hand side of the center. For a substantial distance adjacent the center line 14 of the right-hand half of the middle portion 1b, the curve 12 has a very large radius of curvature, being almost flat. A similar condition obtains at the left-hand half of the curve 12 adjacent the centerline 115. When the strain gages 3, 4, 5 and 6 are centered on the right and left halves of the connecting portion 1b, then they are substantially equally stressed throughout their length. They should not extend so far from the center lines 14 and 115 of the respective halves of the curve 12 so that they encounter a region of steep strain gradient.

By fastening the load cell in this manner, with the part-cylindrical surface on one side of the beam and with the strain gages located on the opposite flat side and distributed symmetrically with respect to the centers of right and left halves of that surface, a condition is obtained where the variation in stress along the elements is substantially constant. In the embodiment illustrated, all the surfaces are flat except for the part-cylindrical surface 1d. The contours of the beam are easy to manufacture. The radius of curvature of the part-cylindrical surface 1d must be sufficiently large so that the strain gage elements can be accommodated near the flatter portions of the curve 12.

While the embodiment illustrated is preferred, other modifications thereof could be made. For example, the part-cylindrical surface 1d could be on either the upper or the lower face of the beam. Alternatively, both upper and lower faces of the beam could be part-cylindrical. The strain gage elements 3, 4, 5 and 6 can be placed on either surface of the beam, but placement of such strain gages is much easier on a flat surface than on a curved surface. While the beam is shown as having a rectangular cross-section, other cross-sections could be used.

The rectangular cross-section makes available a maximum flat area for disposition of the gages.

While the connection of the beam 1 and bar 10 by means of a rivet 7 is preferred, these parts may alternatively be connected by means of a weld along the edges of their abutting sections. However, a weld involves the use of heat, and the spring rate of the material of the beam 1 and bar 10 might be adversely affected by the use of heat to make the welding connection. Alternatively, the beam 1 and bar 10, welded together, might be subjected to a heat treatment after welding to establish the desired spring rate.

The contours of the beam 1 and bar 10 shown are selected to facilitate their manufacture.

A cantilever beam of constant thickness and width throughout its length, when subjected to load at its free end, has a linear increase in moment along the length of the beam, and hence a linear increase in strain with respect to length. The thickness of the beam of the present invention is varied with respect to length so as to provide an approximately uniform strain over substantial lengths of the beam, as shown by the nearly flat portions of the curve 12 in FIG. 3.

The folded cantilever beam assembly illustrated, with a load applied in line with the location of minimum thickness of the beam, results in the beam 1 being stressed by a vertical load at the end portion 1c plus a moment applied by the bar 10.

The variation of strain along the length of the beam as shown by the curve 12 in FIG. 3, provides a substantially uniform distribution of strain at the locations where the strain gage elements 3, 4, 5 and 6 are attached.

The strain sensing apparatus of the present invention, when loaded, averages the strain at the gages, as is typical of resistance strain gages of the prior art. The overall deflection of the beam is less for a given load. In other words, the beam is stiffer and has a higher spring rate. Hence, a smaller beam can be used for a given capacity requirement.

The strain gage elements 3 and 5 are located so that the strains upon them when the beam is loaded are equal and opposite to the strains on the gages 4 and 6.

FIG. 4

Figure 4:
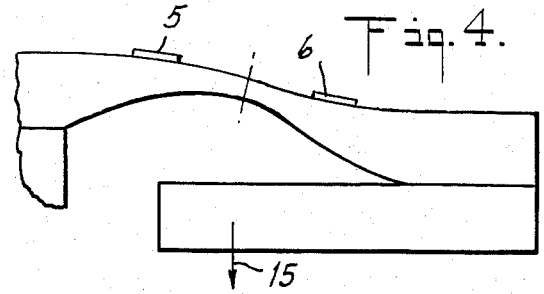
FIG. 4 is a diagrammatic illustration of the contour of the load cell under load as compared to the unloaded condition shown in FIG. 2.

This figure illustrates the deformation of the beam 1 when a load is applied downwardly at the end of the bar 10, in the direction of the arrow 15 in FIGS. 2 and 4.

Note that the resistance strain gages 3 and 5 are located at the region of maximum convex curvature of the upper surface of beam 1 and the gages 4 and 6 are located at the region of maximum concave curvature of the upper surface of the beam 1.

FIG. 5

This figure illustrates the electrical connections of the strain gages 3, 4, 5 and 6. The gages 3 and 5 are connected in two opposite arms of a Wheatstone bridge. Gages 4 and 6 are connected in the other two opposite arms of the bridge. An input voltage is applied to two terminals of the bridge by means of a battery 16, and the output voltage appears at the two opposite terminals of the bridge circuit, as shown at 17.

We claim:

1. Strain sensing apparatus, comprising:
    a. a single elongated beam having one end portion adapted for mounting on a fixed support, an opposite end portion adapted to receive a force acting at right angles to the length of the beam, and an arch-shaped portion connecting said end portions, said end portions having substantially equal and constant cross-sectional areas and said connecting portion having opposed flat and part-cylindrical surfaces and a cross-sectional area which decreases gradually from said equal area at each end to a minimum at its center;
    b. a plurality of strain gage resistance elements fixed on said flat surface of the connecting portion and spaced from the middle of said connecting portion in opposite directions from said middle;
    c. said part-cylindrical surface having its axis at right angles to said force and aligned with the middle of the connecting portion and having a radius of curvature sufficiently large so that the strain gage elements may be mounted on said connecting portion at regions of low strain gradient; and
    d. said strain gage elements being short as compared to the half-lengths of the connecting portion and located at the middle of said half-lengths where there is minimal variation in strain along the length of the connecting portion when the load on the beam is constant, said elements having their centers at locations of maximum strain in said connecting portion and being fixed at locations of equal and opposite strain.

* * * * *